(12) United States Patent
Noh et al.

(10) Patent No.: US 8,913,578 B2
(45) Date of Patent: Dec. 16, 2014

(54) METHOD AND APPARATUS FOR TRANSMITTING APERIODIC SOUNDING REFERENCE SIGNALS IN A WIRELESS COMMUNICATION SYSTEM

(75) Inventors: Min Seok Noh, Anyang-si (KR); Jae Hoon Chung, Anyang-si (KR)

(73) Assignee: LG Electronics Inc., Seoul (KR)

( * ) Notice: Subject to any disclaimer, the term of this patent is extended or adjusted under 35 U.S.C. 154(b) by 152 days.

(21) Appl. No.: 13/810,430

(22) PCT Filed: Jul. 18, 2011

(86) PCT No.: PCT/KR2011/005256
§ 371 (c)(1),
(2), (4) Date: Jan. 28, 2013

(87) PCT Pub. No.: WO2012/008812
PCT Pub. Date: Jan. 19, 2012

(65) Prior Publication Data
US 2013/0128855 A1    May 23, 2013

Related U.S. Application Data

(60) Provisional application No. 61/364,816, filed on Jul. 16, 2010, provisional application No. 61/366,150, filed on Jul. 20, 2010, provisional application No. 61/423,098, filed on Dec. 15, 2010.

(30) Foreign Application Priority Data

Jul. 18, 2011   (KR) .................. 10-2011-0070741

(51) Int. Cl.
*H04Q 7/00*      (2006.01)
*H04W 72/04*    (2009.01)
*H04L 5/00*      (2006.01)

(52) U.S. Cl.
CPC ......... *H04W 72/0453* (2013.01); *H04L 5/0051* (2013.01); *H04L 5/0078* (2013.01); *H04L 5/001* (2013.01)
USPC ............................ 370/329; 370/328; 370/280

(58) Field of Classification Search
None
See application file for complete search history.

(56) References Cited

U.S. PATENT DOCUMENTS

| | | | |
|---|---|---|---|
| 8,379,536 B2 * | 2/2013 | Montojo et al. | 370/252 |
| 2005/0195791 A1 | 9/2005 | Sung et al. | |
| 2005/0288020 A1 | 12/2005 | Cho et al. | |
| 2010/0246561 A1 * | 9/2010 | Shin et al. | 370/345 |
| 2012/0184206 A1 * | 7/2012 | Kim et al. | 455/9 |

FOREIGN PATENT DOCUMENTS

| | | |
|---|---|---|
| EP | 0 432 052 B1 | 7/1998 |
| EP | 1 296 155 A1 | 3/2003 |
| KR | 10-2005-0089709 A | 9/2005 |
| KR | 10-2005-0119997 A | 12/2005 |

* cited by examiner

*Primary Examiner* — Duc C Ho
(74) *Attorney, Agent, or Firm* — Birch, Stewart, Kolasch & Birch, LLP

(57) ABSTRACT

The present invention relates to a method and apparatus in which a terminal transmits aperiodic sounding reference signals (SRSs) in a wireless communication system. The terminal receives a triggering bit for triggering the transmission of the aperiodic SRSs from a base station, and transmits the aperiodic SRSs through at least one uplink (UL) component carrier (CC) from among a plurality of uplink component carriers.

14 Claims, 12 Drawing Sheets

FIG. 7
(a)
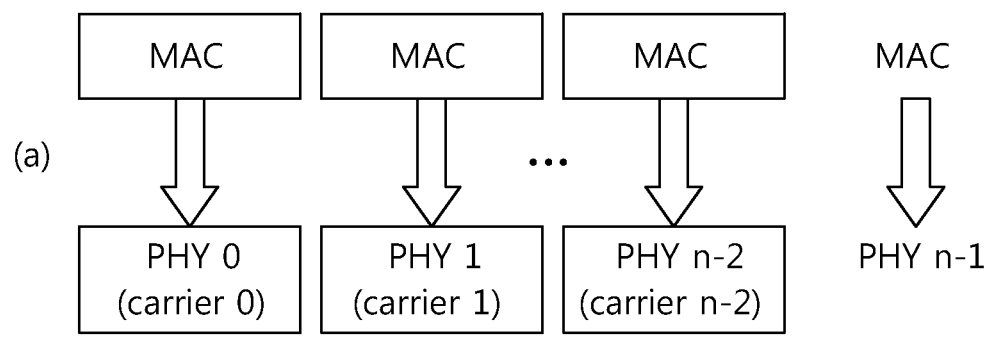
(b)
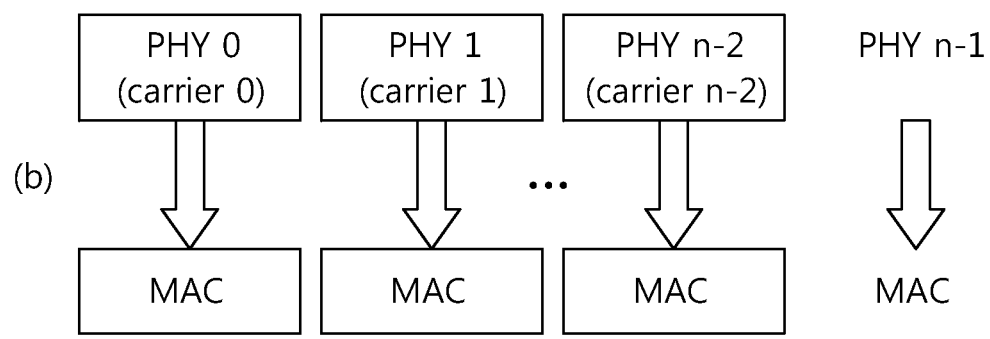

METHOD AND APPARATUS FOR TRANSMITTING APERIODIC SOUNDING REFERENCE SIGNALS IN A WIRELESS COMMUNICATION SYSTEM

CROSS REFERSNCE TO RELATED APPLICATIONS

This application is the National phase of PCT/KR2011/005256 filed on Jul. 18, 2011, which claims priority under 35 U.S.C. 119(e) to U.S. Provisional Application No. 61/364,816 filed on Jul. 16, 2010, U.S. Provisional Application No. 61/366,150 filed on Jul. 20, 2010, U.S. Provisional Application No. 61/423,098 filed on Dec. 15, 2010 and under 35 U.S.C. 119(a) to patent application Ser. No. 10-2011-0070741 filed in Republic of Korea on Jul. 18, 2011, all of which are hereby expressly incorporated by reference into the present application.

BACKGROUND OF THE INVENTION

1. Field of the Invention

The present invention relates to wireless communication, and more particularly, to a method and apparatus for transmitting an aperiodic sounding reference signal in a wireless communication system.

2. Related Art

In wireless communication systems, it is necessary to estimate an uplink channel or a downlink channel for the purpose of the transmission and reception of data, the acquisition of system synchronization, and the feedback of channel information. In wireless communication system environments, fading is generated because of multi-path time latency. A process of restoring a transmit signal by compensating for the distortion of the signal resulting from a sudden change in the environment due to such fading is referred to as channel estimation. It is also necessary to measure the state of a channel for a cell to which a user equipment belongs or other cells. To estimate a channel or measure the state of a channel, a reference signal (RS) which is known to both a transmitter and a receiver can be used.

A subcarrier used to transmit the reference signal is referred to as a reference signal subcarrier, and a subcarrier used to transmit data is referred to as a data subcarrier. In an OFDM system, a method of assigning the reference signal includes a method of assigning the reference signal to all the subcarriers and a method of assigning the reference signal between data subcarriers. The method of assigning the reference signal to all the subcarriers is performed using a signal including only the reference signal, such as a preamble signal, in order to obtain the throughput of channel estimation. If this method is used, the performance of channel estimation can be improved as compared with the method of assigning the reference signal between data subcarriers because the density of reference signals is in general high. However, since the amount of transmitted data is small in the method of assigning the reference signal to all the subcarriers, the method of assigning the reference signal between data subcarriers is used in order to increase the amount of transmitted data. If the method of assigning the reference signal between data subcarriers is used, the performance of channel estimation can be deteriorated because the density of reference signals is low. Accordingly, the reference signals should be properly arranged in order to minimize such deterioration.

A receiver can estimate a channel by separating information about a reference signal from a received signal because it knows the information about a reference signal and can accurately estimate data, transmitted by a transmit stage, by compensating for an estimated channel value. Assuming that the reference signal transmitted by the transmitter is p, channel information experienced by the reference signal during transmission is h, thermal noise occurring in the receiver is n, and the signal received by the receiver is y, it can result in y=h·p+n. Here, since the receiver already knows the reference signal p, it can estimate a channel information value $\hat{h}$ using Equation 1 in the case in which a Least Square (LS) method is used.

$$\hat{h}=y/p=h+n/p=h+\hat{n} \qquad \text{<Equation 1>}$$

The accuracy of the channel estimation value $\hat{h}$ estimated using the reference signal p is determined by the value $\hat{n}$. To accurately estimate the value h, the value $\hat{n}$ must converge on 0. To this end, the influence of the value $\hat{n}$ has to be minimized by estimating a channel using a large number of reference signals. A variety of algorithms for a better channel estimation performance may exist.

An uplink reference signal can be classified into a demodulation reference signal (DMRS) and a sounding reference signal (SRS). The DMRS is a reference signal used for channel estimation to demodulate a received signal. The DMRS can be combined with PUSCH or PUCCH transmission. The SRS is a reference signal transmitted for uplink scheduling by a user equipment to a base station. Transmission of the SRS may be found in the section 5.5.3 of 3GPP TS 36.211 V9.1.0 (2010-03), and an operation of a terminal in an SRS transmission process may be found in the section 8.2 of 3GPP TS 36.213 V9.1.0 (2010-03).

The SRS may be periodically transmitted, or when a base station requires SRS transmission, may be aperiodically transmitted by being triggered by the base station. In addition, the SRS can be transmitted in a carrier aggregation system in which a plurality of component carriers (CCs) are defined.

Accordingly, there is a need for a method of indicating SRS transmission when an SRS is transmitted through at least one CC in a carrier aggregation system.

SUMMARY OF THE INVENTION

The present invention provides a method and apparatus for transmitting an aperiodic sounding reference signal (SRS) in a wireless communication system. The present invention also provides a method for indicating at least one component carrier (CC) in which an SRS is transmitted when a plurality of component carriers (CCs) are defined in a wireless communication system.

In an aspect, a method of transmitting, by a terminal, an aperiodic sounding reference signal (SRS) in a wireless communication system is provided. The method includes receiving a triggering bit for triggering transmission of the aperiodic SRS from a base station, and transmitting the aperiodic SRS through at least one uplink (UL) component carrier (CC) among a plurality of UL CCs.

The triggering bit may be transmitted through a single physical downlink control channel (PDCCH).

The triggering bit may be transmitted together with a UL grant transmitted through the single PDCCH or a downlink (DL) grant for DL assignment.

The triggering bit may be transmitted independently of a DL grant or a UL grant transmitted through the single PDCCH, and the at least one UL CC may be indicated by the remaining fields or bits of the UL grant or the DL grant.

The aperiodic SRS may be transmitted through the plurality of UL CCs such that the aperiodic SRS does not overlap in a time domain.

The at least one UL CC for transmitting the aperiodic SRS may be a UL CC indicated by a UL grant including the triggering bit.

The at least one UL CC for transmitting the aperiodic SRS may be a UL CC having a system information block (SIB)-2 linkage relation with a DL CC for transmitting a UL grant including the triggering bit.

The at least one UL CC for transmitting the aperiodic SRS may be a UL CC indicated by a carrier indication field (CIF) included in a UL grant.

The at least one UL CC for transmitting the aperiodic SRS may be a UL CC having a virtual SIB-2 linkage relation with a DL CC for transmitting a UL grant.

The at least one UL CC for transmitting the aperiodic SRS may be a UL CC indicated by a UL grant including the triggering bit or a UL CC having an index adjacent to that of a UL CC having an SIB-2 linkage relation with a DL CC for transmitting the UL grant including the triggering bit.

The index may be either a CC index or a frequency index.

The at least one UL CC for transmitting the aperiodic SRS may be a specific UL CC configured by radio resource control (RRC).

The at least one UL CC for transmitting the aperiodic SRS may be all activated UL CCs or all configured UL CCs defined in a system.

The method may further include receiving a parameter for indicating whether the aperiodic SRS is transmitted through one UL CC or a plurality of UL CCs.

In another aspect, a terminal in a wireless communication system is provided. The terminal includes a radio frequency (RF) unit for transmitting or receiving a radio signal, and a processor coupled to the RF unit. The processor is configured for receiving a triggering bit for triggering transmission of an aperiodic sounding reference signal (SRS) from a base station, and transmitting the aperiodic SRS through at least one uplink (UL) component carrier (CC) among a plurality of UL CCs.

A sounding reference signal can be effectively transmitted through at least one component carrier (CC).

BRIEF DESCRIPTION OF THE DRAWINGS

FIG. 7 and FIG. 8 are other examples of a transmitter and a receiver which constitute a carrier aggregation system.

DESCRIPTION OF EXEMPLARY EMBODIMENTS

The following technique may be used for various wireless communication systems such as code division multiple access (CDMA), a frequency division multiple access (FDMA), time division multiple access (TDMA), orthogonal frequency division multiple access (OFDMA), single carrier-frequency division multiple access (SC-FDMA), and the like. The CDMA may be implemented as a radio technology such as universal terrestrial radio access (UTRA) or CDMA2000. The TDMA may be implemented as a radio technology such as a global system for mobile communications (GSM)/general packet radio service (GPRS)/enhanced data rates for GSM evolution (EDGE). The OFDMA may be implemented by a radio technology such as IEEE (Institute of Electrical and Electronics Engineers) 802.11 (Wi-Fi), IEEE 802.16 (WiMAX), IEEE 802.20, E-UTRA (Evolved UTRA), and the like. IEEE 802.16m, an evolution of IEEE 802.16e, provides backward compatibility with a system based on IEEE 802.16e. The UTRA is part of a universal mobile telecommunications system (UMTS). 3GPP ($3^{rd}$ generation partnership project) LTE (long term evolution) is part of an evolved UMTS (E-UMTS) using the E-UTRA, which employs the OFDMA in downlink and the SC-FDMA in uplink. LTE-A (advanced) is an evolution of 3GPP LTE.

Hereinafter, for clarification, LTE-A will be largely described, but the technical concept of the present invention is not meant to be limited thereto.

Figure 1:
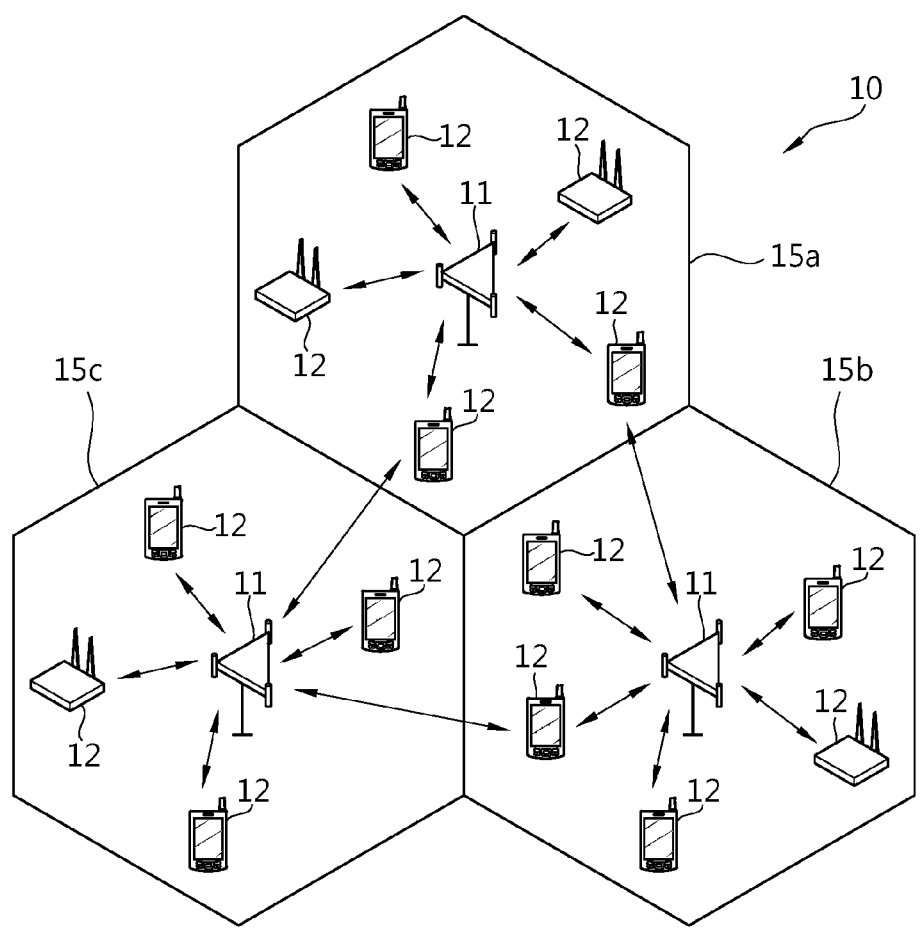
FIG. 1 shows a wireless communication system.

FIG. 1 shows a wireless communication system.

The wireless communication system 10 includes at least one base station (BS) 11. Respective BSs 11 provide a communication service to particular geographical areas 15a, 15b, and 15c (which are generally called cells). Each cell may be divided into a plurality of areas (which are called sectors). A user equipment (UE) 12 may be fixed or mobile and may be referred to by other names such as MS (mobile station), MT (mobile terminal), UT (user terminal), SS (subscriber station), wireless device, PDA (personal digital assistant), wireless modem, handheld device. The BS 11 generally refers to a fixed station that communicates with the UE 12 and may be called by other names such as eNB (evolved-NodeB), BTS (base transceiver system), access point (AP), etc.

In general, a UE belongs to one cell, and the cell to which a UE belongs is called a serving cell. A BS providing a communication service to the serving cell is called a serving BS. The wireless communication system is a cellular system, so a different cell adjacent to the serving cell exists. The different cell adjacent to the serving cell is called a neighbor cell. A BS providing a communication service to the neighbor cell is called a neighbor BS. The serving cell and the neighbor cell are relatively determined based on a UE.

This technique can be used for downlink or uplink. In general, downlink refers to communication from the BS 11 to the UE 12, and uplink refers to communication from the UE 12 to the BS 11. In downlink, a transmitter may be part of the BS 11 and a receiver may be part of the UE 12. In uplink, a transmitter may be part of the UE 12 and a receiver may be part of the BS 11.

The wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmission antennas and a plurality of reception antennas. The MISO system uses a plurality of transmission antennas and a single reception antenna. The SISO system uses a single transmission antenna and a single reception antenna. The SIMO system uses a single transmission antenna and a plurality of reception antennas. Hereinafter, a transmission antenna refers to a physical or logical antenna used for transmitting a signal or a stream, and a reception antenna refers to a physical or logical antenna used for receiving a signal or a stream.

Figure 2:
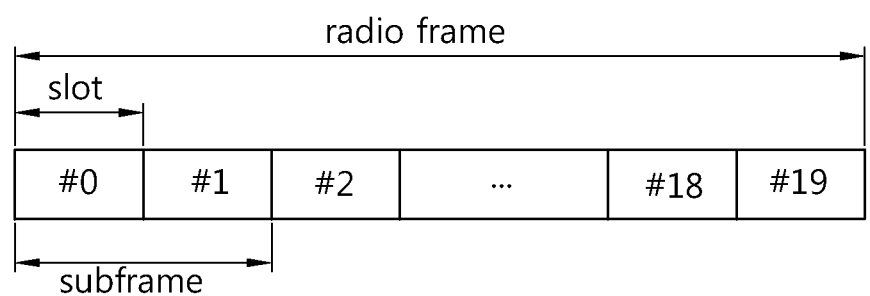
FIG. 2 shows the structure of a radio frame in 3GPP LTE.

FIG. 2 shows the structure of a radio frame in 3GPP LTE.

It may be referred to Paragraph 5 of "Technical Specification Group Radio Access Network; Evolved Universal Terrestrial Radio Access (E-UTRA); Physical channels and modulation (Release 8)" to 3GPP (3rd generation partnership project) TS 36.211 V8.2.0 (2008-03). Referring to FIG. 2, the radio frame includes 10 subframes, and one subframe includes two slots. The slots in the radio frame are numbered by #0 to #19. A time taken for transmitting one subframe is called a transmission time interval (TTI). The TTI may be a scheduling unit for a data transmission. For example, a radio frame may have a length of 10 ms, a subframe may have a length of 1 ms, and a slot may have a length of 0.5 ms.

One slot includes a plurality of OFDM (Orthogonal Frequency Division Multiplexing) symbols in a time domain and a plurality of subcarriers in a frequency domain. Since 3GPP LTE uses OFDMA in downlink, the OFDM symbols are used to express a symbol period. The OFDM symbols may be called by other names depending on a multiple-access scheme. For example, when SC-FDMA is in use as an uplink multi-access scheme, the OFDM symbols may be called SC-FDMA symbols. A resource block (RB), a resource allocation unit, includes a plurality of continuous subcarriers in a slot. The structure of the radio frame is merely an example. Namely, the number of subframes included in a radio frame, the number of slots included in a subframe, or the number of OFDM symbols included in a slot may vary.

3GPP LTE defines that one slot includes seven OFDM symbols in a normal cyclic prefix (CP) and one slot includes six OFDM symbols in an extended CP.

The wireless communication system may be divided into a frequency division duplex (FDD) scheme and a time division duplex (TDD) scheme. According to the FDD scheme, an uplink transmission and a downlink transmission are made at different frequency bands. According to the TDD scheme, an uplink transmission and a downlink transmission are made during different periods of time at the same frequency band. A channel response of the TDD scheme is substantially reciprocal. This means that a downlink channel response and an uplink channel response are almost the same in a given frequency band. Thus, the TDD-based wireless communication system is advantageous in that the downlink channel response can be obtained from the uplink channel response. In the TDD scheme, the entire frequency band is time-divided for uplink and downlink transmissions, so a downlink transmission by the BS and an uplink transmission by the UE can be simultaneously performed. In a TDD system in which an uplink transmission and a downlink transmission are discriminated in units of subframes, the uplink transmission and the downlink transmission are performed in different subframes.

Figure 3:
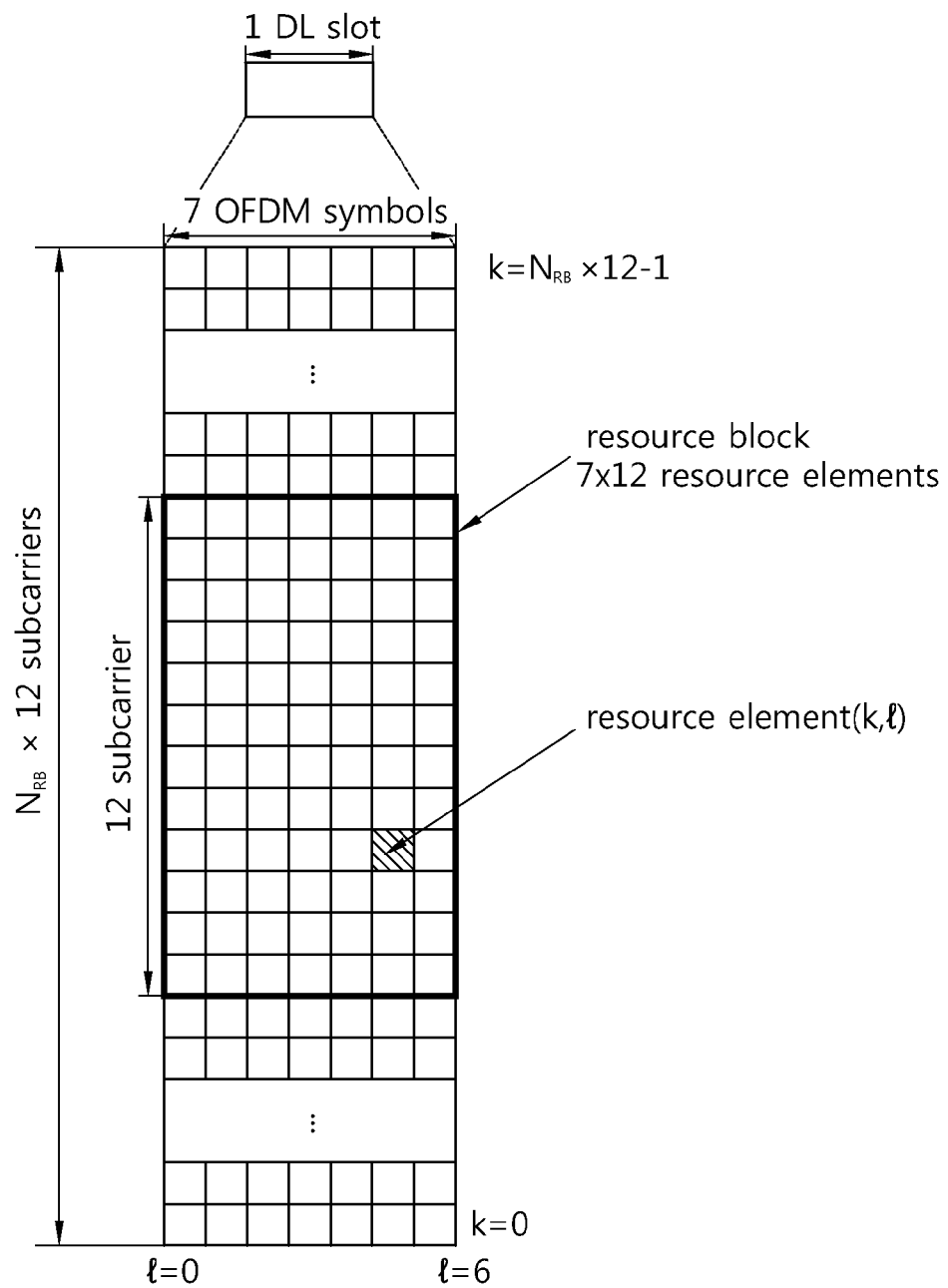
FIG. 3 shows an example of a resource grid of a single downlink slot.

FIG. 3 shows an example of a resource grid of a single downlink slot.

A downlink slot includes a plurality of OFDM symbols in the time domain and $N_{RB}$ number of resource blocks (RBs) in the frequency domain. The $N_{RB}$ number of resource blocks included in the downlink slot is dependent upon a downlink transmission bandwidth set in a cell. For example, in an LTE system, $N_{RB}$ may be any one of 60 to 110. One resource block includes a plurality of subcarriers in the frequency domain. An uplink slot may have the same structure as that of the downlink slot.

Each element on the resource grid is called a resource element. The resource elements on the resource grid can be discriminated by a pair of indexes (k,l) in the slot. Here, k (k=0, . . . , $N_{RB} \times 12-1$) is a subcarrier index in the frequency domain, and l is an OFDM symbol index in the time domain.

Here, it is illustrated that one resource block includes 7×12 resource elements made up of seven OFDM symbols in the time domain and twelve subcarriers in the frequency domain, but the number of OFDM symbols and the number of subcarriers in the resource block are not limited thereto. The number of OFDM symbols and the number of subcarriers may vary depending on the length of a cyclic prefix (CP), frequency spacing, and the like. For example, in case of a normal CP, the number of OFDM symbols is 7, and in case of an extended CP, the number of OFDM symbols is 6. One of 128, 256, 512, 1024, 1536, and 2048 may be selectively used as the number of subcarriers in one OFDM symbol.

Figure 4:
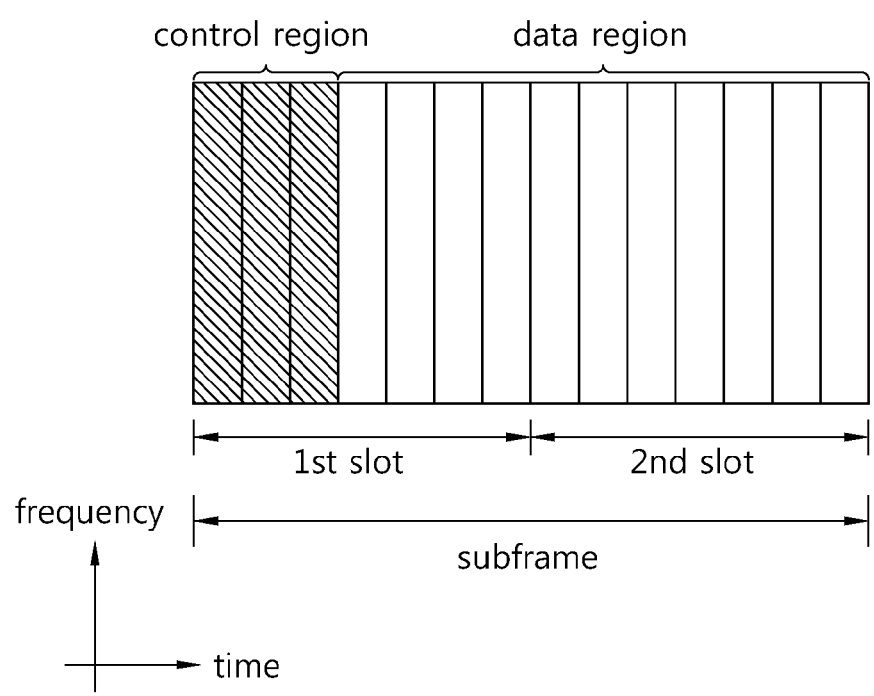
FIG. 4 shows the structure of a downlink subframe.

FIG. 4 shows the structure of a downlink subframe.

A downlink subframe includes two slots in the time domain, and each of the slots includes seven OFDM symbols in the normal CP. First three OFDM symbols (maximum four OFDM symbols with respect to a 1.4 Mhz bandwidth) of a first slot in the subframe corresponds to a control region to which control channels are allocated, and the other remaining OFDM symbols correspond to a data region to which a physical downlink shared channel (PDSCH) is allocated.

The PDCCH may carry a transmission format and a resource allocation of a downlink shared channel (DL-SCH), resource allocation information of an uplink shared channel (UL-SCH), paging information on a PCH, system information on a DL-SCH, a resource allocation of an higher layer control message such as a random access response transmitted via a PDSCH, a set of transmission power control commands with respect to individual UEs in a certain UE group, an activation of a voice over internet protocol (VoIP), and the like. A plurality of PDCCHs may be transmitted in the control region, and a UE can monitor a plurality of PDCCHs. The PDCCHs are transmitted on one or an aggregation of a plurality of consecutive control channel elements (CCE). The CCE is a logical allocation unit used to provide a coding rate according to the state of a wireless channel. The CCD corresponds to a plurality of resource element groups. The format of the PDCCH and an available number of bits of the PDCCH are determined according to an associative relation between the number of the CCEs and a coding rate provided by the CCEs.

The BS determines a PDCCH format according to a DCI to be transmitted to the UE, and attaches a cyclic redundancy check (CRC) to the DCI. A unique radio network temporary identifier (RNTI) is masked on the CRC according to the owner or the purpose of the PDCCH. In case of a PDCCH for a particular UE, a unique identifier, e.g., a cell-RNTI (C-RNTI), of the UE, may be masked on the CRC. Or, in case of a PDCCH for a paging message, a paging indication identifier, e.g., a paging-RNTI (P-RNTI), may be masked on the CRC. In case of a PDCCH for a system information block (SIB), a system information identifier, e.g., a system information-RNTI (SI-RNTI), may be masked on the CRC. In order to indicate a random access response, i.e., a response to a transmission of a random access preamble of the UE, a random access-RNTI (RA-RNTI) may be masked on the CRC. The DCI to which the CRC is attached may be transmitted by using channel coding and rate matching.

Figure 5:
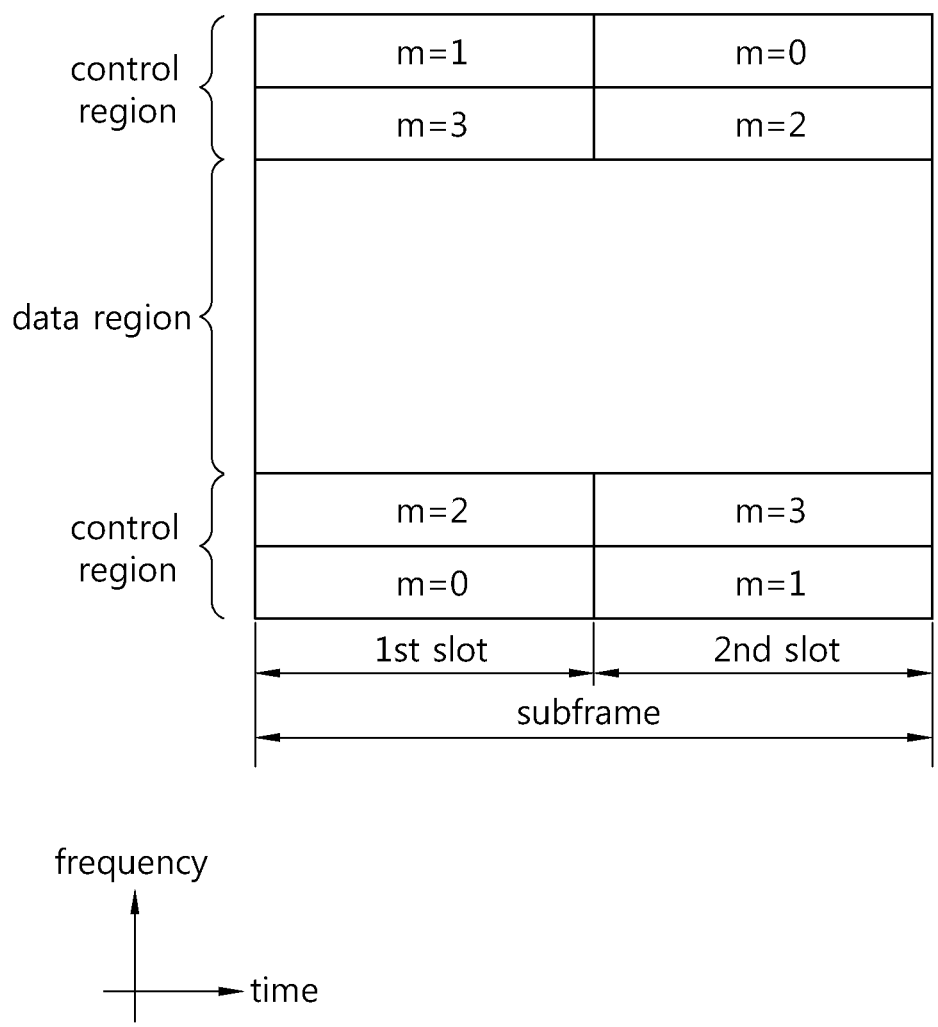
FIG. 5 shows the structure of an uplink subframe.

FIG. 5 shows the structure of an uplink subframe.

An uplink subframe may be divided into a control region and a data region in the frequency domain. A physical uplink control channel (PUCCH) for transmitting uplink control information is allocated to the control region. A physical uplink shared channel (PUCCH) for transmitting data is allocated to the data region. When indicated by a higher layer, the UE may support a simultaneous transmission of the PUSCH and the PUCCH.

The PUCCH with respect to a UE is allocated by a pair of resource blocks in a subframe. The resource blocks belonging to the pair of resource blocks (RBs) occupy different subcarriers in first and second slots, respectively. The frequency occupied by the RBs belonging to the pair of RBs is changed based on a slot boundary. This is said that the pair of RBs allocated to the PUCCH are frequency-hopped at the slot boundary. The UE can obtain a frequency diversity gain by transmitting uplink control information through different subcarriers according to time. In FIG. 5, m is a position index indicating the logical frequency domain positions of the pair of RBs allocated to the PUCCH in the subframe.

Uplink control information transmitted on the PUCCH may include a hybrid automatic repeat request (HARQ) acknowledgement/non-acknowledgement (ACK/NACK), a channel quality indicator (CQI) indicating the state of a downlink channel, an scheduling request (SR), and the like.

The PUSCH is mapped to a uplink shared channel (UL-SCH), a transport channel. Uplink data transmitted on the PUSCH may be a transport block, a data block for the UL-SCH transmitted during the TTI. The transport block may be user information. Or, the uplink data may be multiplexed data. The multiplexed data may be data obtained by multiplexing the transport block for the UL-SCH and control information. For example, control information multiplexed to data may include a CQI, a precoding matrix indicator (PMI), an HARQ, a rank indicator (RI), or the like. Or the uplink data may include only control information.

3GPP LTE-A supports a carrier aggregation system. 3GPP TR 36.815 V9.0.0 (2010-3) may be incorporated herein by reference to describe the carrier aggregation system.

The carrier aggregation system implies a system that configures a wideband by aggregating one or more carriers having a bandwidth smaller than that of a target wideband when the wireless communication system intends to support the wideband. The carrier aggregation system can also be referred to as other terms such as a bandwidth aggregation system or the like. The carrier aggregation system can be divided into a contiguous carrier aggregation system in which carriers are contiguous to each other and a non-contiguous carrier aggregation system in which carriers are separated from each other. In the contiguous carrier aggregation system, frequency spacing may exist between CCs. A CC which is a target when aggregating one or more CCs can directly use a bandwidth that is used in the legacy system in order to provide backward compatibility with the legacy system. For example, a 3GPP LTE system can support a bandwidth of 1.4 MHz, 3 MHz, 5 MHz, 10 MHz, 15 MHz, and 20 MHz, and a 3GPP LTE-A system can configure a wideband of 20 MHz or higher by using only the bandwidth of the 3GPP LTE system. Alternatively, the wideband can be configured by defining a new bandwidth without having to directly use the bandwidth of the legacy system.

In the carrier aggregation system, a UE can transmit or receive one or a plurality of carriers simultaneously according to capacity. An LTE-A UE can transmit or receive a plurality of carriers simultaneously. An LTE rel-8 UE can transmit or receive only one carrier when each of carriers constituting the carrier aggregation system is compatible with an LTE rel-8 system. Therefore, when the number of carriers used in uplink is equal to the number of carriers used in downlink, it is necessary to configure such that all CCs are compatible with LTE rel-8.

In order to efficiently use the plurality of carriers, the plurality of carriers can be managed in a media access control (MAC). To transmit/receive the plurality of carriers, a transmitter and a receiver both have to be able to transmit/receive the plurality of carriers.

Figure 6:
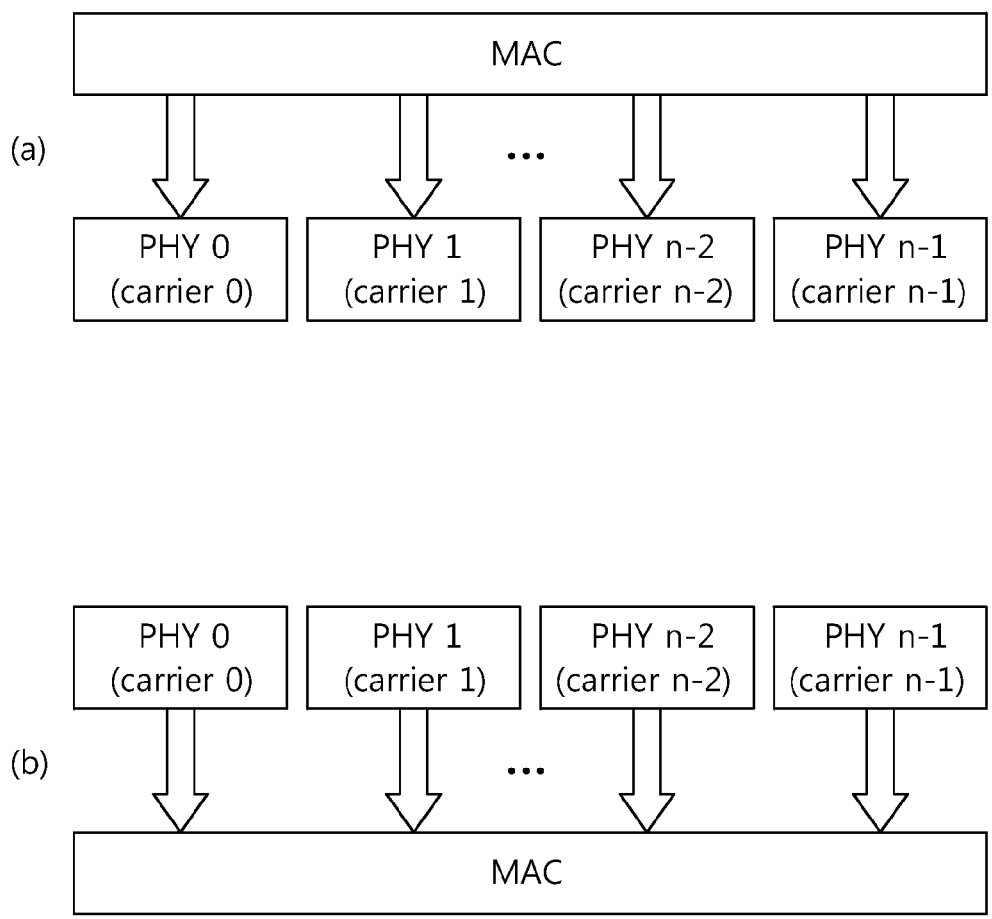
FIG. 6 shows an example of a transmitter and a receiver which constitute a carrier aggregation system.

FIG. 6 shows an example of a transmitter and a receiver which constitute a carrier aggregation system.

In the transmitter of FIG. 6(a), one MAC transmits and receives data by managing and operating all of n carriers. This is also applied to the receiver of FIG. 6(b). From the perspective of the receiver, one transport block and one HARQ entity may exist per CC. A UE can be scheduled simultaneously for a plurality of CCs. The carrier aggregation system of FIG. 6 can apply both to a contiguous carrier aggregation system and a non-contiguous carrier aggregation system. The respective carriers managed by one MAC do not have to be contiguous to each other, which results in flexibility in terms of resource management.

Figure 8:
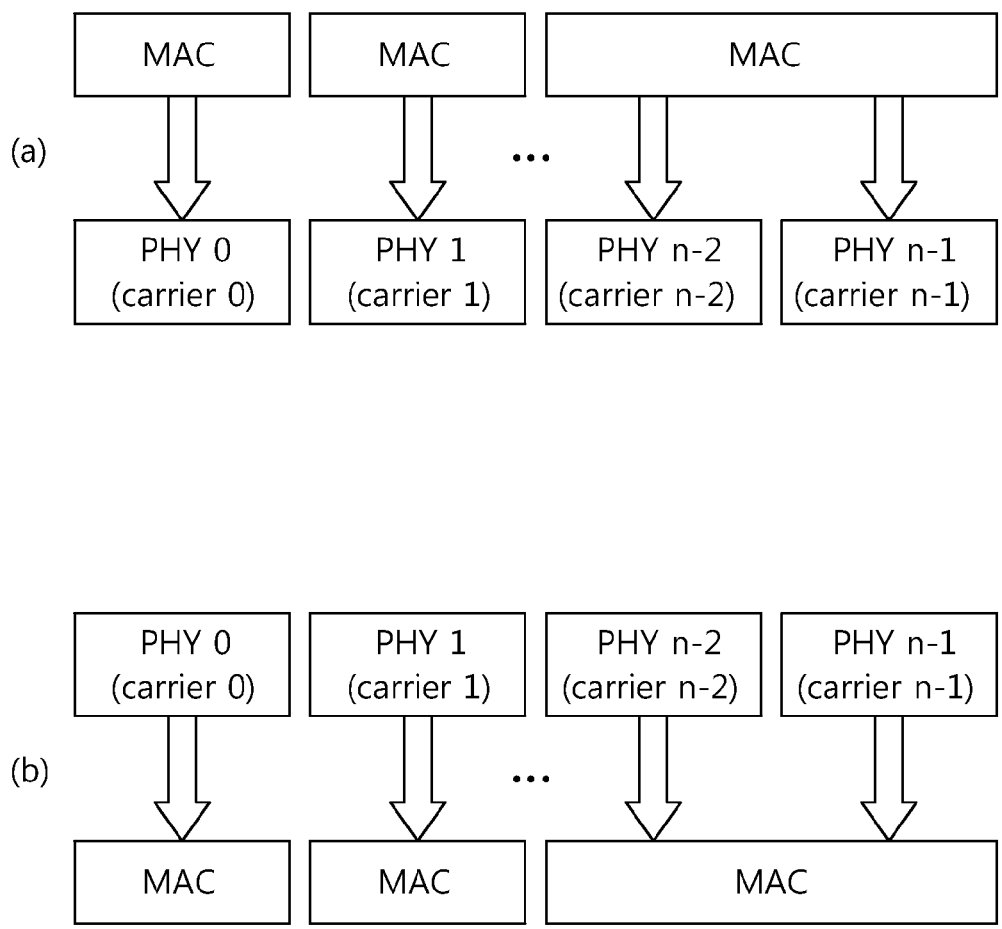

FIG. 7 and FIG. 8 are other examples of a transmitter and a receiver which constitute a carrier aggregation system.

In the transmitter of FIG. 7(a) and the receiver of FIG. 7(b), one MAC manages only one carrier. That is, the MAC and the carrier are 1:1 mapped. In the transmitter of FIG. 8(a) and the receiver of FIG. 8(b), a MAC and a carrier are 1:1 mapped for some carriers, and regarding the remaining carriers, one MAC controls a plurality of CCs. That is, various combinations are possible based on a mapping relation between the MAC and the carrier.

The carrier aggregation system of FIG. 6 to FIG. 8 includes n carriers. The respective carriers may be contiguous to each other or may be separated from each other. The carrier aggregation system can apply both to uplink and downlink transmissions. In a TDD system, each carrier is configured to be able to perform uplink transmission and downlink transmission. In an FDD system, a plurality of CCs can be used by dividing them for an uplink usage and a downlink usage. In a typical TDD system, the number of CCs used in uplink transmission is equal to that used in downlink transmission, and each carrier has the same bandwidth. The FDD system can configure an asymmetric carrier aggregation system by allowing the number of carriers and the bandwidth to be different between uplink and downlink transmissions.

Figure 9:
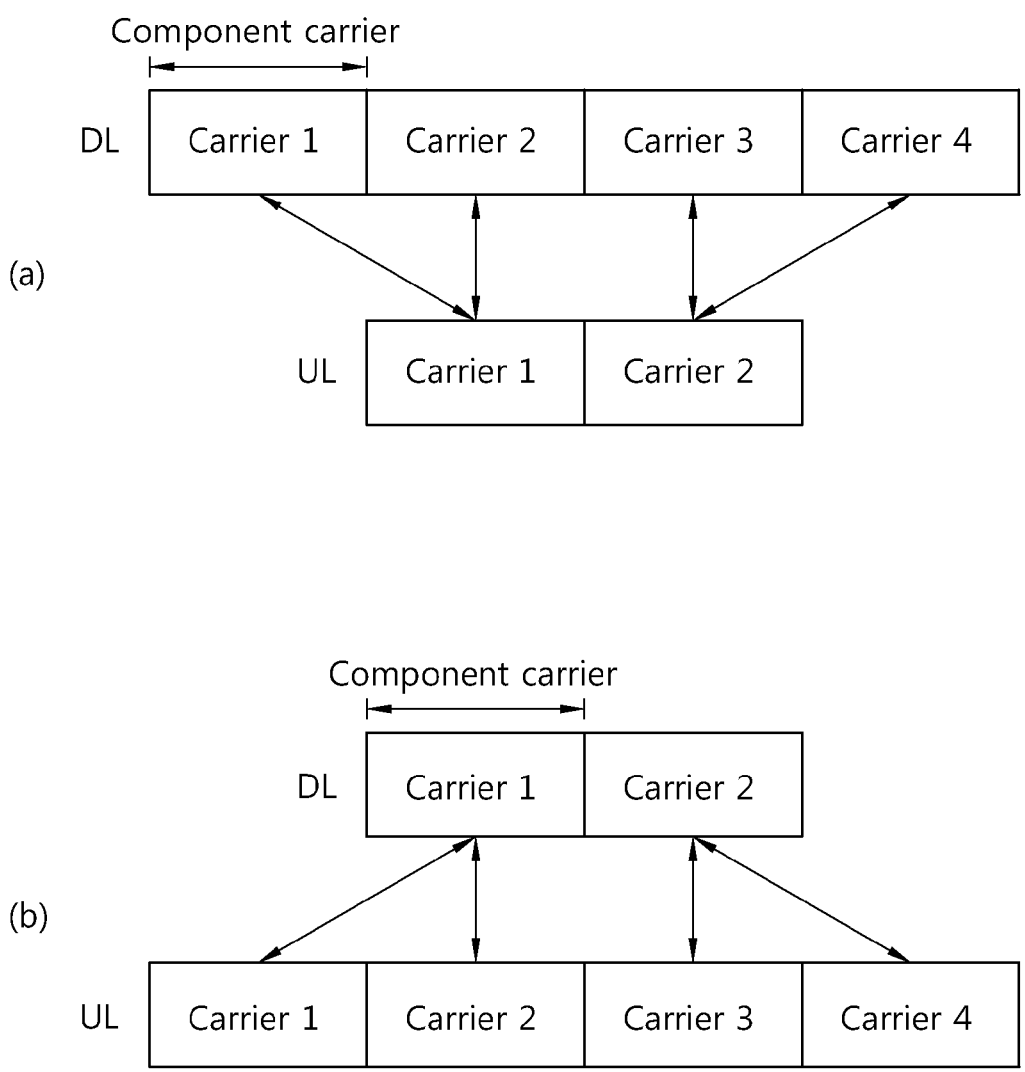
FIG. 9 shows an example of an asymmetric carrier aggregation system.

FIG. 9 shows an example of an asymmetric carrier aggregation system.

FIG. 9(a) shows an example of a carrier aggregation system in which the number of downlink CCs is greater than the number of uplink CCs. Downlink CCs #1 and #2 are linked to an uplink CC #1. Downlink CCs #3 and #4 are linked to an uplink CC #2. FIG. 9(b) shows an example of a carrier aggregation system in which the number of uplink CCs is greater than the number of downlink CCs. A downlink CC #1 is linked to uplink CCs #1 and #2. A downlink CC #2 is linked to uplink CCs #3 and #4. Meanwhile, one transport block and one HARQ entity exist per CC which is scheduled from the perspective of a UE. Each transport block is mapped to only one CC. The UE can be mapped simultaneously to a plurality of CCs.

Meanwhile, the concept of a cell can be applied in the LTE-A system. The cell is an entity configured by combining at least one unit of DL resources and selectively included UL resources from the perspective of a UE. That is, one cell must include at least one unit of DL resources, but may not include UL resources. The one unit of DL resources may be one DL CC. A linkage between a carrier frequency of a DL resource and a carrier frequency of a UL resource can be indicated by an SIB2 transmitted using the DL resource. Although a component carrier (CC) will be taken as an example in the following descriptions of the present invention, it is apparent that the CC can be replaced with a cell.

A cell type can be classified according to an allocation method. First, the number of cells allocated to an entire system may be fixed. For example, the number of cells allocated to the entire system may be 8. All or some of the cells allocated to the entire system may be allocated by radio resource control (RRC) signaling of a higher layer. The cell allocated by the RRC signaling is called a configured cell. That is, the configured cell may imply a cell allocated to be usably by the system among the cells allocated to the entire system. All or some of the configured cells may be allocated by media access control (MAC) signaling. The cell allocated by the MAC signaling can be called an activated cell. Among the configured cells, the remaining cells other than the activated cell can be called a deactivated cell. All or some of the activated cells are allocated to the UE by using L1/L2 signaling. The cell allocated by using the L1/L2 signaling can be called a scheduled cell. The scheduling cell can receive data through a PDSCH by using a DL resource in a cell, and can transmit data through a PUSCH by using a UL resource.

Hereinafter, an uplink reference signal (RS) will be described.

In general, an RS is transmitted as a sequence. Any sequence can be used as a sequence used for an RS sequence without particular restrictions. The RS sequence may be a phase shift keying (PSK)-based computer generated sequence. Examples of the PSK include binary phase shift keying (BPSK), quadrature phase shift keying (QPSK), etc. Alternatively, the RS sequence may be a constant amplitude zero auto-correlation (CAZAC) sequence. Examples of the CAZAC sequence include a Zadoff-Chu (ZC)-based sequence, a ZC sequence with cyclic extension, a ZC sequence with truncation, etc. Alternatively, the RS sequence may be a pseudo-random (PN) sequence. Example of the PN sequence include an m-sequence, a computer generated sequence, a Gold sequence, a Kasami sequence, etc. In addition, the RS sequence may be a cyclically shifted sequence.

The uplink RS can be classified into a demodulation reference signal (DMRS) and a sounding reference signal (SRS). The DMRS is an RS used for channel estimation to demodulate a received signal. The DMRS can be combined with PUSCH or PUCCH transmission. The SRS is an RS transmitted for uplink scheduling by a UE to a BS. The BS estimates an uplink channel by using the received SRS, and the estimated uplink channel is used in uplink scheduling. The SRS is not combined with PUSCH or PUCCH transmission. The same type of base sequences can be used for the DMRS and the SRS. Meanwhile, precoding applied to the DMRS in uplink multi-antenna transmission may be the same as precoding applied to the PUSCH. Cyclic shift separation is a primary scheme for multiplexing the DMRS. In an LTE-A system, the SRS may not be precoded, and may be an antenna-specific RS.

The SRS is an RS transmitted by a relay station to the BS and is an RS which is not related to uplink data or control signal transmission. In general, the SRS may be used for channel quality estimation for frequency selective scheduling in uplink or may be used for other usages. For example, the SRS may be used in power control, initial MCS selection, initial power control for data transmission, etc. In general, the SRS is transmitted in a last SC-FDMA symbol of one subframe.

Table 1 and Table 2 show one example of a cell-specific subframe configuration period parameter $T_{SFC}$ and a cell-specific subframe offset parameter $\Delta_{SFC}$ for SRS transmission.

Table 1 shows one example of SRS subframe configuration in an FDD system. According to Table 1, the SRS subframe configuration can be indicted by a parameter having a length of 4 bits, and the periodicity of the SRS subframe may be any one of 1, 2, 5, and 10 subframes.

TABLE 5

| srsSubframeConfiguration | Binary | Configuration Period $T_{SFC}$ (subframes) | Transmission offset $\Delta_{SFC}$ (subframes) |
|---|---|---|---|
| 0 | 0000 | 1 | {0} |
| 1 | 0001 | 2 | {0} |
| 2 | 0010 | 2 | {1} |
| 3 | 0011 | 5 | {0} |
| 4 | 0100 | 5 | {1} |
| 5 | 0101 | 5 | {2} |
| 6 | 0110 | 5 | {3} |
| 7 | 0111 | 5 | {0, 1} |
| 8 | 1000 | 5 | {2, 3} |
| 9 | 1001 | 10 | {0} |
| 10 | 1010 | 10 | {1} |
| 11 | 1011 | 10 | {2} |
| 12 | 1100 | 10 | {3} |
| 13 | 1101 | 10 | {0, 1, 2, 3, 4, 6, 8} |
| 14 | 1110 | 10 | {0, 1, 2, 3, 4, 5, 6, 8} |
| 15 | 1111 | reserved | reserved |

Table 2 shows one example of SRS subframe configuration in a TDD system.

TABLE 2

| srsSubframeConfiguration | Binary | Configuration Period $T_{SFC}$ (subframes) | Transmission offset $\Delta_{SFC}$ (subframes) |
|---|---|---|---|
| 0 | 0000 | 5 | {1} |
| 1 | 0001 | 5 | {1, 2} |
| 2 | 0010 | 5 | {1, 3} |
| 3 | 0011 | 5 | {1, 4} |
| 4 | 0100 | 5 | {1, 2, 3} |
| 5 | 0101 | 5 | {1, 2, 4} |
| 6 | 0110 | 5 | {1, 3, 4} |
| 7 | 0111 | 5 | {1, 2, 3, 4} |
| 8 | 1000 | 10 | {1, 2, 6} |
| 9 | 1001 | 10 | {1, 3, 6} |
| 10 | 1010 | 10 | {1, 6, 7} |
| 11 | 1011 | 10 | {1, 2, 6, 8} |
| 12 | 1100 | 10 | {1, 3, 6, 9} |
| 13 | 1101 | 10 | {1, 4, 6, 7} |
| 14 | 1110 | reserved | reserved |
| 15 | 1111 | reserved | reserved |

Table 3 and Table 4 show one example of UE-specific SRS configuration for indicating an SRS transmission periodicity $T_{SRS}$ and an SRS subframe offset $T_{offset}$. The SRS transmission periodicity $T_{SRS}$ can be determined from {2, 5, 10, 20, 40, 80, 160, 320} ms.

Table 3 shows one example of SRS configuration in an FDD system.

TABLE 3

| SRS Configuration Index $I_{SRS}$ | SRS Periodicity $T_{SRS}$ (ms) | SRS Subframe Offset $T_{offset}$ |
|---|---|---|
| 0-1 | 2 | $I_{SRS}$ |
| 2-6 | 5 | $I_{SRS}$ - 2 |
| 7-16 | 10 | $I_{SRS}$ - 7 |
| 17-36 | 20 | $I_{SRS}$ - 17 |
| 37-76 | 40 | $I_{SRS}$ - 37 |
| 77-156 | 80 | $I_{SRS}$ - 77 |

TABLE 3-continued

| SRS Configuration Index $I_{SRS}$ | SRS Periodicity $T_{SRS}$ (ms) | SRS Subframe Offset $T_{offset}$ |
|---|---|---|
| 157-316 | 160 | $I_{SRS}$ - 157 |
| 317-636 | 320 | $I_{SRS}$ - 317 |
| 637-1023 | reserved | reserved |

Table 4 shows one example of SRS configuration in a TDD system.

TABLE 4

| Configuration Index $I_{SRS}$ | SRS Periodicity $T_{SRS}$ (ms) | SRS Subframe Offset $T_{offset}$ |
|---|---|---|
| 0 | 2 | 0, 1 |
| 1 | 2 | 0, 2 |
| 2 | 2 | 1, 2 |
| 3 | 2 | 0, 3 |
| 4 | 2 | 1, 3 |
| 5 | 2 | 0, 4 |
| 6 | 2 | 1, 4 |
| 7 | 2 | 2, 3 |
| 8 | 2 | 2, 4 |
| 9 | 2 | 3, 4 |
| 10-14 | 5 | $I_{SRS}$ - 10 |
| 15-24 | 10 | $I_{SRS}$ - 15 |
| 25-44 | 20 | $I_{SRS}$ - 25 |
| 45-84 | 40 | $I_{SRS}$ - 45 |
| 85-164 | 80 | $I_{SRS}$ - 85 |
| 165-324 | 160 | $I_{SRS}$ - 165 |
| 325-644 | 320 | $I_{SRS}$ - 325 |
| 645-1023 | reserved | reserved |

An SRS subframe satisfies $(10*n_f+k_{SRS}-T_{offset})$ mod $T_{SRS}=0$ in the FDD system and, if $T_{SRS}>2$, in the TDD system. $n_f$ denotes a frame index, and $k_{SRS}$ denotes a subframe index in a frame in the FDD system. In the TDD system, if $T_{SRS}=2$, two SRS resources can be configured in a half-frame including at least one uplink subframe, and an SRS subframe satisfies $(k_{SRS}-T_{offset})$ mod $5=0$.

In the TDD system, $k_{SRS}$ can be determined by Table 5.

TABLE 5

| | subframe index n | | | | | | | | | |
|---|---|---|---|---|---|---|---|---|---|---|
| | | 1 | | | | | 6 | | | |
| | 0 | 1st symbol of UpPTS | 2nd symbol of UpPTS | 2 | 3 | 4 | 5 | 1st symbol of UpPTS | 2nd symbol of UpPTS | 7 | 8 | 9 |
| $k_{SRS}$ in case UpPTS length of 2 symbols | 0 | 1 | | 2 | 3 | 4 | | 5 | 6 | 7 | 8 | 9 |
| $k_{SRS}$ in case UpPTS length of 1 symbol | 1 | | | 2 | 3 | 4 | | 6 | | 7 | 8 | 9 |

The SKS transmission method can be classified into two. There are a period SKS transmission method that periodically transmits an SRS according to an SRS parameter received by radio resource control (RRC) signaling as defined in LTE rel-8, and an aperiodic SRS transmission method that transmits an SRS whenever necessarily on the basis of a message dynamically triggered from a BS. The aperiodic SRS transmission method can be used in LTE-A.

In the periodic SRS transmission method and the aperiodic SRS transmission method, an SRS can be transmitted in a UE-specific SRS subframe determined in a UE-specific manner. In a periodic SRS transmission method defined in LTE rel-8, a cell-specific SRS subframe is configured periodically by a cell-specific SRS parameter, and periodic SRS transmission is performed in a periodic UE-specific SRS subframe configured by a UE-specific SRS parameter among cell-specific SRS subframes. In this case, the periodic UE-specific SRS subframe may be a subset of the cell-specific subframe. The cell-specific SRS parameter can be given by a higher layer. In the aperiodic SRS transmission method, an aperiodic SRS can be transmitted in an aperiodic UE-specific SRS subframe determined by a UE-specific aperiodic SRS parameter. The aperiodic UE-specific SRS subframe of the aperiodic SRS transmission method may be a subset of the cell-specific SRS subframe as defined in the LTE rel-8. Alternatively, the aperiodic UE-specific SRS subframe may be the same as the cell-specific subframe. The UE-specific aperiodic SRS parameter may also be given by a higher layer similarly to the cell specific SRS parameter. The UE-specific aperiodic SRS subframe can be configured by the aforementioned subframe periodicity and subframe offset of Table 3 or Table 4.

Meanwhile, an aperiodic SRS transmitted through a specific UL CC can be transmitted simultaneously with another SRS transmitted through another UL CC. When a resource for transmitting the aperiodic SRS does not overlap with a resource for transmitting the periodic SRS, a UE can simultaneously transmit the aperiodic SRS and the periodic SRS. In this case, the UE can transmit the aperiodic SRS and the periodic SRS through a plurality of UL CCs in various manners. For example, a UL CC that transmits the aperiodic SRS may be a primary CC (PCC), an anchor CC, or a secondary CC (SCC). Alternatively, the UL CC that transmits the aperiodic SRS may be some UL CCs among configured UL CCs determined by RRC signaling, and in this case, the some UL CCs that transmit the SRS can be indicated by RRC signaling or L1/L2 control signaling.

When the SRS is transmitted through a plurality of UL CCs, a method for effectively indicating the plurality of UL CCs for carrying the SRS is required. This method includes a method of triggering SRS transmission through the plurality of UL CCs and a method of indicating at least one UL CC for transmitting the SRS. Although the SRS is limited to an aperiodic SRS hereinafter for convenience of explanation, the present invention is not limited thereto and thus is also applicable not only to the aperiodic SRS but also to a periodic SRS.

Hereinafter, the proposed aperiodic SRS transmission method will be described according to an embodiment of the present invention.

First, a method of triggering aperiodic SRS transmission through a plurality of UL CCs by using transmission of a single PDCCH and a method of indicating a plurality of CCs in which the aperiodic SRS is transmitted will be described.

1) Transmission of an aperiodic SRS through a plurality of UL CCs can be triggered by a UL grant transmitted through a single PDCCH or a grant for DL assignment (i.e., a DL grant). That is, a triggering bit for triggering the aperiodic SRS transmission through the plurality of UL CCs can be transmitted together with the UL grant or the DL grant. In this case, among the plurality of UL CCs, a CC for transmitting the aperiodic SRS may be a UL CC based on a DL/UL CC linkage. For example, the aperiodic SRS can be transmitted through a UL CC which is in a system information block (SIB)-2 linkage relation with a DL CC for transmitting the UL grant or the DL grant. Alternatively, the aperiodic SRS can be transmitted through a UL CC to which a PUSCH is assigned by the UL grant. Alternatively, the aperiodic SRS can be transmitted through a UL CC having an SIB-2 linkage relation with a DL CC assigned by the DL grant. As such, since the triggering bit is transmitted together with the UL grant or the DL grant, it is possible to indicate the UL CC for transmitting the aperiodic SRS, without having to use an additional bit or a code point in the UL grant or the DL grant and without having to increase the number of blind decoding attempts of a UE. By triggering transmission of the aperiodic SRS according to a predetermined rule and by indicating the UL CC for transmitting the aperiodic SRS, ambiguity of a UE operation can be decreased.

2) If the triggering bit for triggering the transmission of the aperiodic SRS is not transmitted simultaneously with the UL grant or the DL grant, at least one UL CC for transmitting the aperiodic SRS can be indicated by using the remaining fields in the UL grant or the DL grant. If a plurality of UL CCs for transmitting the aperiodic SRS is indicated by using such a method, a channel can be measured by the aperiodic SRS transmitted in each UL CC. Cross-carrier scheduling or cross-carrier channel dependent scheduling can be performed on the basis of a channel measured in each UL CC, and thus there may be an advantage in that a performance gain is obtained.

If the transmission of the aperiodic SRS is triggered through the plurality of UL CC by using PDCCH transmission, one UL CC or a plurality of UL CCs in which the SRS is transmitted can be indicated. First, the aperiodic SRS is transmitted in a first single UL CC indicated by a UL grant or a DL grant. Thereafter, when the aperiodic SRS is transmitted, the UL CC for transmitting the aperiodic SRS can be implicitly indicated according to an index of a CC sorted in an ascending or descending order. That is, the plurality of UL CCs for transmitting the aperiodic SRS may be time-staggered in a time domain. The aperiodic SRS is not transmitted simultaneously in two or more UL CCs. Only one UL CC transmits the aperiodic SRS in a specific time. For example, the aperiodic SRS can be transmitted at a different time sequentially in an ascending order of an index of the UL CC according to a predetermined rule. Accordingly, if the aperiodic SRS is transmitted simultaneously in the plurality of UL CCs, a peak-to-average power ratio (PAPR)/cubic metric (CM) can be prevented from being increased, and a single carrier property can be prevented from not being maintained in an SC-FDMA transmission scheme. Such a method can be used when a cell-specific subframe structure is identical in all UL CCs.

Figure 10:
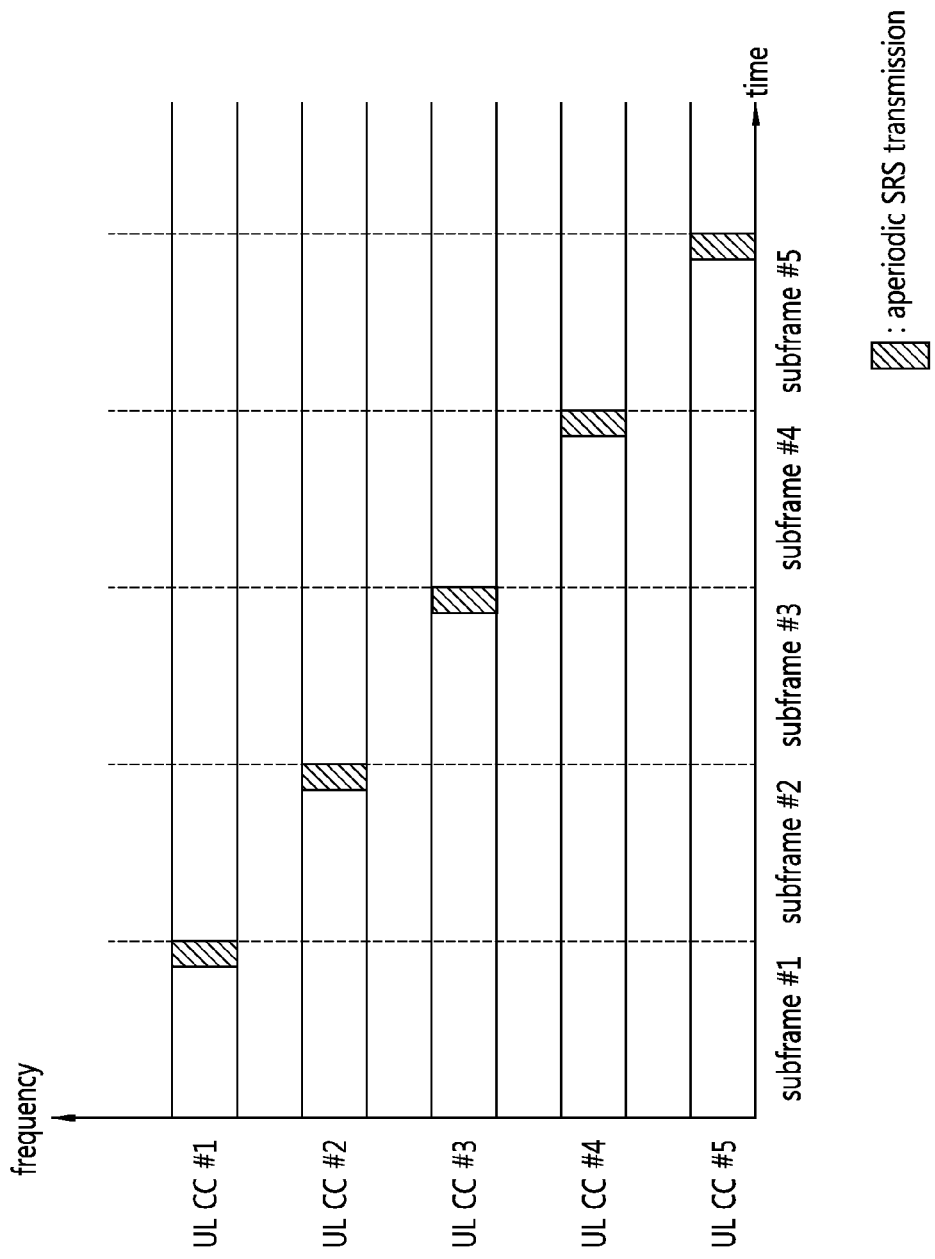
FIG. 10 shows a case in which a plurality of UL CCs for transmitting an aperiodic SRS according to the proposed aperiodic SRS transmission method is time-staggered in a time domain.

FIG. 10 shows a case in which a plurality of UL CCs for transmitting an aperiodic SRS according to the proposed aperiodic SRS transmission method is time-staggered in a time domain.

Referring to FIG. 10, in the plurality of UL CCs, the aperiodic SRS is transmitted in a time-staggered manner in the time domain. In a $1^{st}$ subframe, the aperiodic SRS is first transmitted through a $1^{st}$ UL CC. Thereafter, in a $2^{nd}$ subframe, a $3^{rd}$ subframe, a $4^{th}$ subframe, and a $5^{th}$ subframe, the aperiodic SRS is transmitted respectively through a $2^{nd}$ UL CC, a $3^{rd}$ UL CC, a $4^{th}$ UL CC, and a $5^{th}$ UL CC, in that order. In one subframe, the aperiodic SRS can be transmitted through only one UL CC.

Alternatively, the aperiodic SRS may be first transmitted in a PCC, and thereafter the aperiodic SRS may be transmitted in a cyclically predetermined cell-specific SRS subframe or a UE-specific SRS subframe in an SCC or the remaining UL CCs. In general, a great amount of control information or data traffic is transmitted through the PCC. Therefore, when cross scheduling is performed according to the present invention, channel dependent scheduling can be always performed with respect to the PCC, and a performance gain can be obtained. In addition, the channel dependent scheduling can also be performed when the cross scheduling is performed for other UL CCs, and thus a performance gain can be additionally obtained.

Hereinafter, a method of indicating a corresponding UL CC is described when an aperiodic SRS is transmitted through any one UL CC among a plurality of UL CCs. Although an SRS is limited to an aperiodic SRS hereinafter for convenience of explanation, the present invention is also applicable without being limited not only to the aperiodic SRS but also to a periodic SRS. The aperiodic SRS and the periodic SRS can be transmitted in the same UL CC. Alternatively, the aperiodic SRS and the periodic SRS can be transmitted in different UL CCs by independently applying the present invention described below.

First, the aperiodic SRS can be transmitted in a UL CC indicated by a UL grant including an aperiodic SRS triggering bit. For example, a carrier indication field (CIF) can be included in the UL grant, and the aperiodic SRS can be transmitted in a UL CC indicated by the CIF. Alternatively, the aperiodic SRS can be transmitted in a UL CC to which a PUSCH is assigned by the UL grant. Accordingly, there is an advantage in that additional control signal signaling is not necessary to indicate the UL CC for transmitting the aperiodic SRS.

Alternatively, the aperiodic SRS can be transmitted in a UL CC (hereinafter, called an SIB-2 linked UL CC) having an SIB-2 linkage relation with a DL CC for transmitting a UL grant including an aperiodic SRS triggering bit. Accordingly, the UL CC for transmitting the aperiodic SRS is implicitly indicated, and additional control signal signaling for indicating the UL CC is not necessary to transmit the aperiodic SRS.

Meanwhile, in a case where the number of DL CCs is 1 and the number of UL CCs is greater than the number of DL CCs (i.e., a UL heavy case), the number of SIB-2 linked UL CCs may also be 1. Therefore, there is at least one UL CC not having the SIB-2 linkage relation with the DL CC for transmitting the UL CC. In this case, since the aperiodic SRS is transmitted only in the SIB-2 linked UL CC, there is a disadvantage in that channel estimation cannot be accurately performed in the UL CC not having the SIB-2 linkage relation. Therefore, various methods can be proposed for transmission of the aperiodic SRS in a different UL CC other than the SIB-2 linked UL CC.

1) A CIF is always included in a UL grant, and the CIF can indicate another UL CC other than an SIB-2 linked UL CC. Accordingly, a UE can transmit an aperiodic SRS through the SIB-2 linked UL CC or a UL CC indicated by the CIF included in the UL grant.

2) Similarly to the method 1), the CIF is always included in the UL grant, and the CIF can indicate another UL CC other than the SIB-2 linked UL CC. The UE first transmits the aperiodic SRS on the basis of the SIB-2 linked UL CC. Thereafter, the aperiodic SRS is transmitted by performing multiplexing in a time division multiplexing (TDM) manner in at least one UL CC sorted in a descending or ascending order according to a specific criterion such as a carrier index order, a frequency index order, or a CIF order. The aperiodic SRS is transmitted through a different subframe sequentially in a plurality of UL CCs, and can be transmitted in a time-staggered manner in a time domain.

3) The UE first transmits the aperiodic SRS on the basis of the UL CC indicated by the UL grant and the SIB-2 linked UL CC. Thereafter, the aperiodic SRS is transmitted by performing multiplexing in a TDM manner in at least one UL CC sorted in a descending or ascending order according to a specific criterion such as a carrier index order, a frequency index order, or a CIF order. The aperiodic SRS is transmitted through a different subframe sequentially in a plurality of UL CCs, and can be transmitted in a time-staggered manner in a time domain.

4) The aperiodic SRS can be transmitted by combining the methods 1), 2), and 3).

5) Alternatively, it can be assumed that the UL CC not having the SIB-2 linkage relation with the DL CC for transmitting the UL grant has a virtual SIB-2 linkage relation with the DL CC. The virtual SIB-2 linkage relation can be explicitly indicated by higher layer signaling, or can be implicitly indicated. As described above, the virtual SIB-2 linkage relation can be configured by being sorted in a descending or ascending order according to a specific criterion such as a carrier index order, a frequency index order, or a CIF order. As such, the virtual SIB-2 linkage relation is configured between the DL CC and the UL CC, and the UE can transmit the aperiodic SRS not only through the SIB-2 linked UL CC but also through the UL CC having the virtual SIB-2 linkage relation when an aperiodic SRS triggering bit is transmitted.

6) Alternatively, in addition to the UL CC of which aperiodic SRS transmission is explicitly indicated, such as the UL CC indicated by the CIF or the SIB-2 linked UL CC, the aperiodic SRS can be transmitted through an implicitly configured UL CC. This is for performing accurate channel estimation in a UL CC other than the explicitly indicated UL CC in a UL heavy case in which the number of DL CCs is 1 and the number of UL CCs is greater than the number of DL CCs.

The UL CC implicitly configured to transmit the aperiodic SRS may be a UL CC adjacent to the explicitly indicated UL CC. That is, if it is explicitly indicated to transmit the aperiodic SRS through a specific UL CC, the aperiodic SRS can be transmitted through the UL CC having an index adjacent to that of the specific UL CC without having to use additional explicit signaling. In this case, the index may be any index capable of indicating the UL CC, for example, an index of the UL CC indicated by the CIF, a frequency index of an E-UTRAN absolute radio frequency channel number (EARFCN), etc. By using the index determined as described above, the UL CC adjacent to the explicitly indicated UL CC can be determined in an ascending or descending order of the index.

The number of UL CCs implicitly configured to transmit the aperiodic SRS may be greater than or equal to 2. For example, if any one of UL CCs linked to a UL CC for transmitting a PUSCH is a UL CC explicitly indicated to transmit the aperiodic SRS, the aperiodic SRS can be transmitted through two or more UL CCs adjacent to the explicitly indicated UL CC.

In addition, information of the UL CC implicitly configured to transmit the aperiodic SRS may be higher-layer signaled through RRC. For example, the number of implicitly configured UL CCs and an index of an adjacent UL CC, that is, information regarding whether the UL CC index is sorted in an ascending order or in a descending order, can be higher-layer signaled through the RRC. In addition, a plurality of UL CCs can be divided into a plurality of UL CC sets, and at least one of the UL CC sets can be indicated to transmit the aperiodic SRS. The at least one UL CC set indicated to transmit the aperiodic SRS can be higher-layer signaled through the RRC or can be dynamically signaled through a PDCCH. Accordingly, the UL CC for transmitting the aperiodic SRS can be combined variously, and system flexibility can be increased.

Meanwhile, if the remaining states or bits are present in the CIF field of the UL grant in the above description (i.e., if there is a state or bit remaining after indicating the DL or UL CC), the remaining states or bits can be used to indicate whether to use the original SIB-2 linked UL CC or the UL CC indicated by the CIF field to transmit the aperiodic SRS. If the virtual SIB-2 linkage relation exists between the DL CC and the UL CC, the remaining states or bits of the CIF field can be used to indicate whether to use the UL CC having the virtual SIB-2 linked to transmit the aperiodic SRS. In addition, if the remaining states or bits are more present in the CIF field, they can be used to indicate whether to use the original SIB-2 linked UL CC or the UL CC having the virtual SIB-2 linkage relation or all UL CCs to transmit the aperiodic SRS. Alternatively, information indicating which UL CC will be used to transmit the aperiodic SRS may be higher-layer signaled through the RRC or may be dynamically signaled through the PDCCH.

Returning to the method of indicating the corresponding UL CC when the aperiodic SRS is transmitted through any one UL CC among the plurality of UL CCs, the UE can transmit the aperiodic SRS in the PCC or can transmit the aperiodic SRS by using the UL CC configured by the RRC.

It is possible to provide a method of indicating a corresponding UL CC when an aperiodic SRS is transmitted through two or more UL CCs among a plurality of UL CCs.

First, the aperiodic SRS can be transmitted through activated UL CCs among a plurality of configured UL CCs. The aperiodic SRS is not transmitted through deactivated UL CCs. Among the plurality of configured UL CCs, UL CCs for actually transmitting data are the activated UL CCs. Therefore, power consumption of a UE can be reduced for the deactivated UL CCs not requiring transmission of the aperiodic SRS.

In a UL heavy case in which the number of DL CCs is 1 and the number of UL CCs is greater than the number of DL CCs, in addition to the method of transmitting the aperiodic SRS through the SIB-2 linked UL CC, the aperiodic SRS can be additionally transmitted through at least one different UL CC determined or indicated by using another method. In this case, the aforementioned methods 1) to 6) can be applied to indicate or determine the at least one UL CC for transmitting an additional aperiodic SRS.

Alternatively, the additional aperiodic SRS can be transmitted through a UL CC explicitly indicated by using various methods. The UL CC may be a UL CC indicated by a CIF or the like in a UL grant, or may be a UL CC to which a PUSCH is assigned by the UL grant. Alternatively, the UL CC may be a UL CC configured by RRC or may be a UL CC indicated by transmission power control (TPC).

When it is configured to use all configured UL CCs or all activated UL CCs to transmit the aperiodic SRS, timing for transmitting the aperiodic SRS in each UL CC can be indicated through higher layer signaling. In a carrier aggregation system, since a subframe for transmitting the aperiodic SRS is independently configured for each UL CC and a periodic SRS is transmitted in addition to the aperiodic SRS, it is not necessary to transmit the aperiodic SRS always in all UL CCs. Therefore, a BS can configure a subframe number, a transmission period, etc., for transmitting the aperiodic SRS for each UL CC, and can report it to a UE through higher layer signaling. Accordingly, the UE can transmit the aperiodic SRS through a cell-specific subframe or a UE-specific subframe configured independently of each UL CC.

According to the method described up to now, the UE can transmit the aperiodic SRS through one or more UL CCs, and when the aperiodic SRS is transmitted through a plurality of UL CCs, it can be transmitted simultaneously through different UL CCs or at different times. Meanwhile, before the aperiodic SRS is transmitted through the plurality of UL CCs, the BS can indicate whether the number of UL CCs capable of transmitting the aperiodic SRS is singular or plural. According to quality of service (QoS) of the UE, carrier aggregation capability, a cell load, whether to perform cross scheduling, etc., the BS can report to the UE about whether to use one UL CC or a plurality of UL CCs to transmit the aperiodic SRS. Information thereof can be higher-layer signaled through RRC, and the UE receives the information and then transmits the aperiodic SRS.

Meanwhile, a triggering bit for triggering transmission of an aperiodic SRS can be used for various usages in the carrier aggregation system.

The triggering bit included in a UL grant or the like may consist of 2 bits. The UL grant including the triggering bit can be blind-decoded in a UL-specific search space. The 2-bit triggering bit can be used to configure a UE-specific parameter for transmission of the aperiodic SRS in a single carrier system, or can be used to indicate a variety of information in the carrier aggregation system. Alternatively, the 2-bit triggering bit is used to configure a UE-specific parameter for transmitting the aperiodic SRS in the carrier aggregation system, and additionally defined 2 bits can be used to indicate a variety of information for transmitting the aperiodic SRS in the carrier aggregation system. The present invention can be commonly applied to a DCI format 0 and a DCI format 4.

For example, if the 2-bit triggering bit indicates a variety of information for transmitting the aperiodic SRS in the carrier aggregation system, '00' may indicate that the aperiodic SRS is not transmitted. '01' may indicate that the aperiodic SRS is transmitted through a UL CC which is SIB-2 linked to a DL CC for transmitting the UL grant including the triggering bit. '10' or '11' may indicate that the aperiodic SRS is transmitted through the UL CC configured by RRC. Alternatively, any one of '10' or '11' can indicate that the aperiodic SRS is transmitted in all configured UL CCs or all activated UL CCs.

Alternatively, the triggering bit included in the DCI format 0 may consist of 1 bit. The 1-bit triggering bit can be activated by an activation parameter defined in an RRC layer. The DCI format 0 including the 1-bit triggering bit can be blind-decoded in a UE-specific search space. In this case, if the 1-bit triggering bit is '0', this may indicate that the aperiodic SRS is not transmitted. '1' may indicate that the aperiodic SRS is transmitted through the UL CC configured by the RRC. The UL CC configured by the RRC may be any one of UL CCs configured by the RRC when the 2-bit triggering bit has a value of '10' or '11'. Alternatively, '1' may indicate that the aperiodic CC is transmitted in all configured UL CCs or all activated UL CCs.

When configuring the UL CC for transmitting the aperiodic SRS by the RRC, a bitmap can be used. If the number of configurable UL CCs is 5, transmission of the aperiodic SRS can be triggered for up to 5 UL CCs by the bitmap. For example, if the bitmap has a value of '01001', transmission of the aperiodic SRS can be triggered through a $2^{nd}$ UL CC and a $5^{th}$ UL CC among the up to 5 UL CCs. That is, bits of the bitmap can indicate respective UL CCs. In this case, an order of the bits indicating the respective UL CCs can be determined by a CC index, a frequency index, or a CIF among the plurality of UL CCs. The 5-bit bitmap can be configured for a configured UL CC or an activated UL CC. In addition, if the number of configured UL CCs or activated UL CCs is less than or equal to 5, a most significant bit (MSB) and its subsequent bits in the 5-bit bitmap can be used to indicate the UL CCs. In this case, unused bits can be set to '0'. For example, if the number of activated UL CCs is 3 and if it is intended to transmit the aperiodic SRS through $1^{st}$ and $3^{rd}$ UL CCs among the activated UL CCs, the 5-bit bitmap can be set to '10100'.

Figure 11:
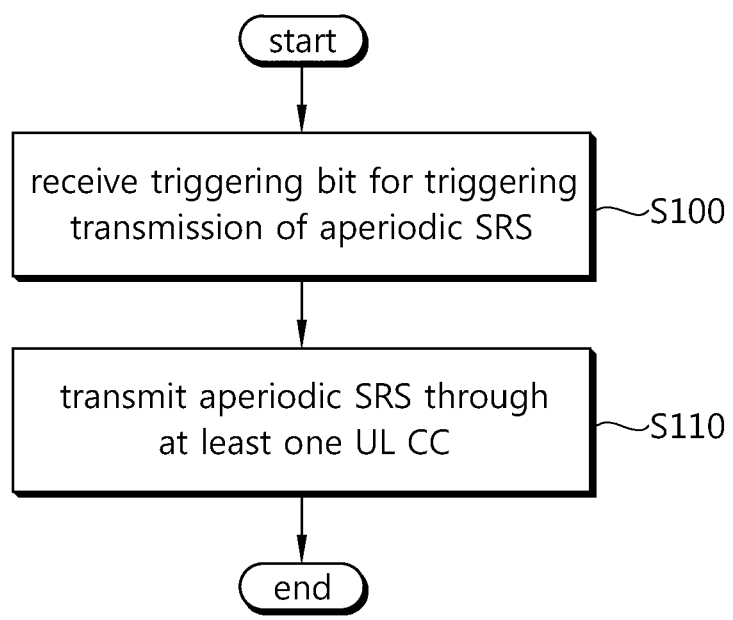
FIG. 11 is a flowchart showing the proposed method of transmitting an aperiodic SRS according to an embodiment of the present invention.

FIG. 11 is a flowchart showing the proposed method of transmitting an aperiodic SRS according to an embodiment of the present invention.

In step S100, a UE receives from a BS a triggering bit for triggering transmission of the aperiodic SRS. In step S110, the UE transmits the aperiodic SRS through at least one UL CC among a plurality of UL CCs. In this case, the aforementioned various aperiodic SRS transmission methods can be applied.

Figure 12:
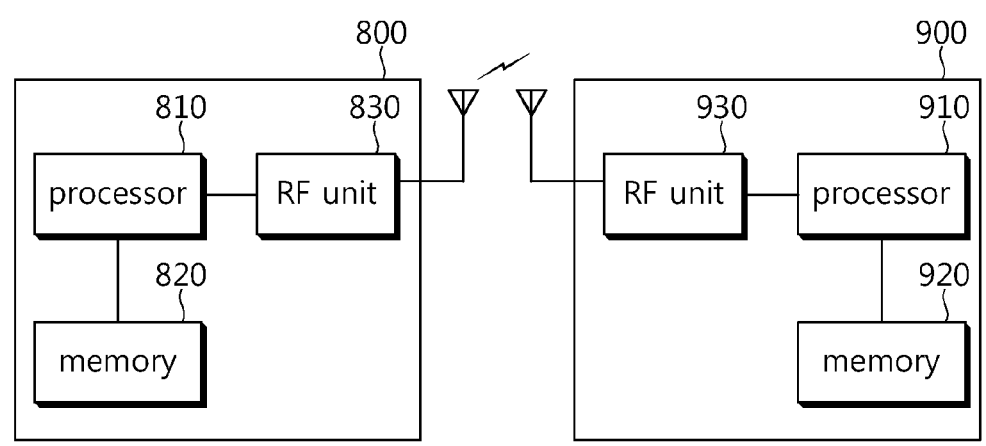
FIG. 12 is a block diagram showing wireless communication system to implement an embodiment of the present invention.

FIG. 12 is a block diagram showing wireless communication system to implement an embodiment of the present invention.

A BS 800 may include a processor 810, a memory 820 and a radio frequency (RF) unit 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The RF unit 830 is operatively coupled with the processor 810, and transmits and/or receives a radio signal.

A UE 900 may include a processor 910, a memory 920 and a RF unit 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The RF unit 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the spirit and scope of the appended claims.

What is claimed is:

1. A method of transmitting, by a terminal, an aperiodic sounding reference signal (SRS) in a wireless communication system, the method comprising:
   receiving a triggering bit for triggering transmission of the aperiodic SRS from a base station; and
   transmitting the aperiodic SRS through at least one uplink (UL) component carrier (CC) among a plurality of UL CCs.
   wherein the at least one UL CC for transmitting the aperiodic SRS is a UL CC having a system information block (SIB)-2 linkage relation with a downlink (DL) CC for transmitting a UL grant including the triggering bit.

2. The method of claim 1, wherein the triggering bit is transmitted through a single physical downlink control channel (PDCCH).

3. The method of claim 2, wherein the triggering bit is transmitted together with a UL grant transmitted through the single PDCCH or a DL grant for DL assignment.

4. The method of claim 2,
   wherein the triggering bit is transmitted independently of a DL grant or a UL grant transmitted through the single PDCCH, and
   wherein the at least one UL CC is indicated by the remaining fields or bits of the UL grant or the DL grant.

5. The method of claim 2, wherein the aperiodic SRS is transmitted through the plurality of UL CCs such that the aperiodic SRS does not overlap in a time domain.

6. The method of claim 1, wherein the at least one UL CC for transmitting the aperiodic SRS is a UL CC indicated by a UL grant including the triggering bit.

7. The method of claim 1, wherein the at least one UL CC for transmitting the aperiodic SRS is a UL CC indicated by a carrier indication field (CIF) included in a UL grant.

8. The method of claim 1, wherein the at least one UL CC for transmitting the aperiodic SRS is a UL CC having a virtual SIB-2 linkage relation with a DL CC for transmitting a UL grant.

9. The method of claim 1, wherein the at least one UL CC for transmitting the aperiodic SRS is a specific UL CC configured by radio resource control (RRC).

10. The method of claim 1, wherein the at least one UL CC for transmitting the aperiodic SRS is all activated UL CCs or all configured UL CCs defined in a system.

11. The method of claim 1, further comprising receiving a parameter for indicating whether the aperiodic SRS is transmitted through one UL CC or a plurality of UL CCs.

12. A terminal in a wireless communication system, the terminal comprising:
   a radio frequency (RF) unit for transmitting or receiving a radio signal; and
   a processor coupled to the RF unit,
   wherein the processor is configured for:
   receiving a triggering bit for triggering transmission of an aperiodic sounding reference signal (SRS) from a base station; and
   transmitting the aperiodic SRS through at least one uplink (UL) component carrier (CC) among a plurality of UL CCs,
   wherein the at least one UL CC for transmitting the aperiodic SRS is a UL CC having a system information block (SIB)-2 linkage relation with a downlink (DL) CC for transmitting a UL grant including the triggering bit.

13. A method of transmitting, by a terminal, an aperiodic sounding reference signal (SRS) in a wireless communication system, the method comprising:
   receiving a triggering bit for triggering transmission of the aperiodic SRS from a base station, and
   transmitting the aperiodic SRS through at least one uplink (UL) component carrier (CC) among a plurality of UL CCs,
   wherein the at least one UL CC for transmitting the aperiodic SRS is a UL CC indicated by a UL grant including the triggering bit or a UL CC having an index adjacent to the of a UL CC having system information block (SIB)-2 linkage relation with a downlink (DL) CC for transmitting the UL grant including the triggering bit.

14. The method of claim 13, wherein the index is either a CC index or a frequency index.

* * * * *